US009333961B2

(12) United States Patent
Elstorpff et al.

(10) Patent No.: US 9,333,961 B2
(45) Date of Patent: May 10, 2016

(54) SPRING BRAKE CYLINDER WITH EMERGENCY RELEASE DEVICE

(71) Applicant: KNORR-BREMSE SYSTEME FÜR SCHIENENFAHRZEUGE GMBH, Munich (DE)

(72) Inventors: Marc-Gregory Elstorpff, Munich (DE); Erich Fuderer, Fürstenfeldbruck (DE); Robert Haupt, Munich (DE); Michael Lehneis, Munich (DE); Bernhard Haemmerl, Maisach (DE); Ferenc Muellek, Szekesfehervar (HU); Zsolt Adams, Budakeszi (HU)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/361,343

(22) PCT Filed: Nov. 30, 2012

(86) PCT No.: PCT/EP2012/074109
§ 371 (c)(1),
(2) Date: May 29, 2014

(87) PCT Pub. No.: WO2013/079667
PCT Pub. Date: Jun. 6, 2013

(65) Prior Publication Data
US 2014/0345987 A1    Nov. 27, 2014

(30) Foreign Application Priority Data
Dec. 2, 2011  (DE) .......................... 10 2011 119 998

(51) Int. Cl.
*B60T 17/08*   (2006.01)
*F16D 65/28*   (2006.01)
(Continued)

(52) U.S. Cl.
CPC .............. *B60T 17/086* (2013.01); *B61H 13/00* (2013.01); *F16D 65/14* (2013.01); *F16D 65/28* (2013.01);
(Continued)

(58) Field of Classification Search
CPC ....... B60T 17/086; F16D 65/14; F16D 65/28; F16D 2121/06; F16D 2121/12; F16D 2121/16; F16D 2125/60; F16D 2127/04
USPC ...... 188/2 D, 153 R, 153 D, 151 A, 170, 216; 74/500.5, 501.5, 502.6; 92/29, 63
See application file for complete search history.

(56) References Cited

U.S. PATENT DOCUMENTS

| 4,552,056 A | 11/1985 | McKay |
| 6,799,502 B2 * | 10/2004 | Wolfsteiner et al. .............. 92/29 |

(Continued)

FOREIGN PATENT DOCUMENTS

| CN | 101795911 A | 8/2010 |
| CN | 101890952 A | 11/2010 |
| DE | 10020350 A1 | 11/2001 |

OTHER PUBLICATIONS

Notification Concerning Transmittal of International Preliminary Report on Patentability and Written Opinion of the International Search Authority for International Patent Application No. PCT/EP2012/074109, dated Nov. 30, 2012.

(Continued)

*Primary Examiner* — Thomas J Williams
(74) *Attorney, Agent, or Firm* — Barnes & Thornburg LLP

(57) ABSTRACT

A spring brake cylinder having a housing in which a spring store piston which is loaded by at least one spring store spring and which has a piston rod is axially movable, and having an emergency release device with an emergency release actuation device, an emergency release mechanism with a toothed wheel for interrupting the force flow between the spring store piston and piston rod, and a holding device designed for holding the emergency release device in various holding positions, wherein the holding device has a pawl, and the emergency release actuation device has at least one actuation element and a driver for driving the pawl.

19 Claims, 7 Drawing Sheets

(51) Int. Cl.
  B61H 13/00 (2006.01)
  F16D 65/14 (2006.01)
  F16D 125/60 (2012.01)
  F16D 127/04 (2012.01)
  F16D 121/06 (2012.01)
  F16D 121/12 (2012.01)
  F16D 121/16 (2012.01)
  F16D 123/00 (2012.01)

(52) U.S. Cl.
  CPC ......... *F16D 2121/06* (2013.01); *F16D 2121/12* (2013.01); *F16D 2121/16* (2013.01); *F16D 2123/00* (2013.01); *F16D 2125/60* (2013.01); *F16D 2127/04* (2013.01)

(56) References Cited

U.S. PATENT DOCUMENTS 8,448,960 B2 * 5/2013 Liu ............................. 188/2 D
2003/0154854 A1 8/2003 Wolfsteiner et al.

OTHER PUBLICATIONS

English Translation of Notification Concerning Transmittal of International Preliminary Report on Patentability and Written Opinion of the International Search Authority for International Patent Application No. PCT/EP2012/074109, dated Nov. 30, 2012.
Search Report for International Patent Application No. PCT/EP2012/074109; Jun. 17, 2013.
Chinese Office Action dated Oct. 10, 2015.

* cited by examiner

SPRING BRAKE CYLINDER WITH EMERGENCY RELEASE DEVICE

PRIORITY CLAIM

This patent application is a U.S. National Phase of International Patent Application No. PCT/EP2012/074109, filed 30 Nov. 2012, which claims priority to German Patent Application No. 10 2011 119 998.9, filed 2 Dec. 2011, the disclosures of which are incorporated herein by reference in their entirety.

FIELD

Disclosed embodiments relate to a spring brake cylinder having a housing in which a spring-loaded piston, loaded by means of at least one accumulator spring, with a piston rod is axially movable, and having an emergency release device comprising an emergency release operating device, an emergency release mechanism with a toothed wheel for interrupting the force flux between spring-loaded piston and piston rod, and also having a retaining device which is designed for holding the emergency release device in different retained positions, wherein the retaining device has a locking pawl which can be pivoted into an engaged and a disengaged position in relation to the toothed wheel, and the emergency release operating device has at least one operating element, which is movable in relation to the housing and loaded in its initial position by return spring means, and also a driver which can be operated together with the operating element for driving the locking pawl in such a way that during an operation of the operating element the operating force is transmitted to the driver and from this transmitted to the locking pawl for transferring the locking pawl from an engaged position in relation to the toothed wheel into a disengaged position.

SUMMARY

Disclosed embodiments provide a spring brake cylinder wherein the locking pawl is to be able to be reliably fully moved into its disengaged position in any event during the emergency release so that the locking pawl can be locked in this position and so that an inadvertent dropping of the locking pawl into the rotating toothed wheel is prevented. Furthermore, damage to the locking pawl as a result of an excessively high operating force is to be prevented. The means for the realization are to be inexpensive in addition.

BRIEF DESCRIPTION OF THE FIGURES

Disclosed embodiments are described in more detail below with reference to the drawing, in which.

DETAILED DESCRIPTION OF THE DISCLOSED EMBODIMENTS

In bogies of rail vehicles, compact brake calipers are used as brake power generators for disk brakes. The parking brake is realized in most cases by means of an integrated, pneumatically actuated spring brake cylinder which has a manually operable, mechanical emergency release device. A brake caliper which is engaged by means of a spring brake cylinder can therefore also be released again when no compressed air is available as an energy source. This emergency release device is actuated via a Bowden cable, for example.

A generic-type spring brake cylinder with emergency release device is described in DE 100 20 350 A1. There, the force of the accumulator springs is transmitted via a non-self-locking thread of a spindle arrangement to the brake caliper. Via a locking pawl, which engages in a toothed wheel which is connected in a rotation-resistant manner to the spindle of the spindle arrangement, rotation of the spindle is prevented. Via a Bowden cable, the pawl can be lifted from the teeth of the toothed wheel. As a result, the resistance to rotation of the spindle is overridden and an axial force can no longer be transmitted via the non-self-locking thread. The locking pawl has to be lifted from the teeth to such a degree that a locking bolt can engage in a corresponding recess on the locking pawl and as a result can hold the locking pawl in the disengaged position even if the Bowden cable is pushed back into its original position. Retention of the locking pawl by means of the locking bolt is overridden if the spring-loaded brake piston is pushed into its released position by pressure application and as a result pushes the locking bolt out of the recess of the locking pawl. In this way, the readiness of the spring brake cylinder after the emergency release is re-established.

Figure 1:
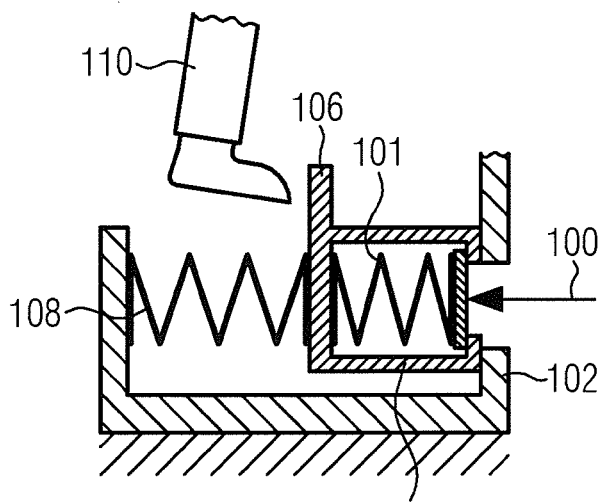
FIG. 1 shows a greatly schematized view of a part of an emergency release device of the prior art.
Figure 5:
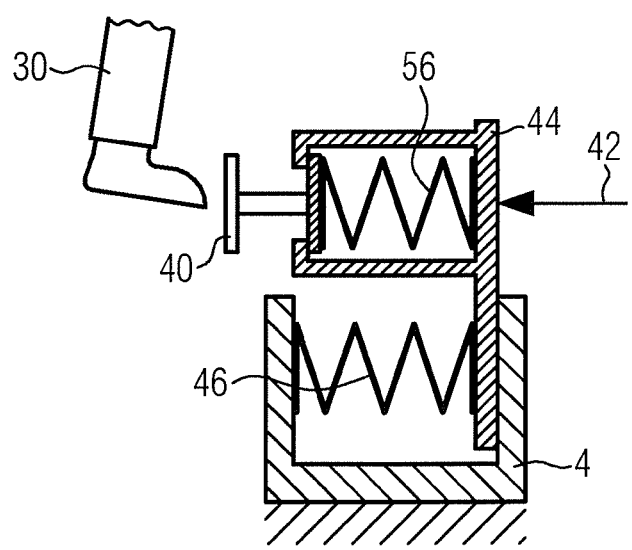
FIG. 5 shows a greatly schematized view of a part of the emergency release device of the spring brake cylinder of FIG. 3.

In particular, in the case of the known emergency release device according to FIG. 1 the force applied via a Bowden cable 100 is applied via a pretensioned spring 101 (reference number 44 there) to a sleeve 104 which is movably mounted in a housing 102 and constitutes the operating element and on which a driver 106 is fastened in an axially fixed manner. The sleeve 104, as the operating element, is in turn pretensioned in its original position by means of an outer return spring 108 (reference number 46 there), wherein the pretensioned spring 101 and the return spring 108 are connected in series. From the driver 106, the operating movement of the Bowden cable 100 is then first of all transmitted to the pretensioned spring 101 and from this to the sleeve 104 and to the driver 106 fastened to it, and from there transmitted to the locking pawl 110.

The locking pawl is preloaded in the position in which it is engaged with the toothed wheel by means of a return spring. After the locking pawl has been lifted by means of the driver from the teeth of the toothed wheel into its disengaged position, it has to be rotated against the force of its return spring until a locking bolt drops into a recess in the locking pawl and so can lock the locking pawl in its disengaged position. If, however, the locking pawl is not lifted out to such a degree that the locking bolt is able to engage in the recess of the locking pawl, two undesirable situations can occur. On the one hand, the locking pawl can even latch into the teeth if the spring-loaded piston has not reached its released position at all, for example as a result of an insufficient release pressure. On the other hand, the locking pawl can drop into the toothed wheel while rotating at high speed, as a result of which damage to the locking pawl and/or to the toothed wheel can occur.

To reliably ensure engagement of the locking bolt in the recess of the locking pawl, it has to be ensured that the locking pawl fully reaches its disengaged position in relation to the toothed wheel. In the case of the prior art discussed above, the force which is required for fully lifting out the locking pawl depends on a match of the series-connected compression spring and return spring on the sleeve and also of the return spring of the locking pawl. This, however, requires very high manufacturing accuracy during production of the springs. Furthermore, the travel on the Bowden cable which is required for lifting out the locking pawl is relatively large. Not least of all, the locking pawl can be overloaded as a result of an excessively high operating force on the Bowden cable.

The disclosed embodiments are based on the idea that between the operating element and the driver, or between the driver and the locking pawl, provision is made for spring means which are connected in parallel to the return spring means and are compressed during the driving of the locking pawl by means of the driver, creating a spring force, wherein this spring force holds the locking pawl in a tensioned manner in the position in which it is disengaged from the toothed wheel when the locking pawl has been brought into the disengaged position in relation to the toothed wheel by operation of the operating element.

In other words, the spring means are compressed when operating the at least one operating element, wherein the spring force which is created during the compression ensures that the locking pawl, brought into its disengaged position, is reliably held in this position, even if the operating element, which for example is loaded in its initial position by means of a return spring, is no longer operated. As a result, it is ensured that the locking pawl can be reliably locked in this disengaged position by means of a locking device, such as a locking bolt.

Also, as in the case of DE 100 20 350 A1, there is no need to match three springs, of which, moreover, two springs are connected in series, with regard to their spring forces, but only two springs, specifically the spring means and also an optionally provided return spring for the locking pawl. The spring means are then connected in parallel in relation to the return spring for the operating element, as is explained in more detail later.

By means of the measures outlined in the dependent claims, advantageous developments and improvements which are disclosed in claim 1 are possible.

Optionally, the operating element has at least one Bowden cable and also an operating sleeve which is movably mounted in the housing and on which the Bowden cable is fastened and which is loaded against an operation by the Bowden cable by means of a restoring return spring. As already explained above, the return spring and the spring means are then connected in parallel.

The spring means may also be designed so that spring force which is exerted upon the locking pawl by the spring means is smaller than a force which is required to move the locking pawl from the engaged position in relation to the toothed wheel into the disengaged position. Instead of the spring force which is created by the spring means, the torque which is created by the spring force can also naturally be used here.

Optionally, the locking pawl is loaded by means of a return spring in the engaged position in relation to the toothed wheel, wherein the spring means are also designed in such a way that the torque which is exerted upon the locking pawl by the spring means is greater than the torque which the return spring exerts upon the locking pawl.

According to a disclosed embodiment, the spring means which are provided between the operating element and the driver have at least one helical spring. In the case of this variant, the driver is movably mounted next to or on the operating element. Furthermore, in this case provision is made for stop means which are connected to the operating element, for example, and against which the axially movable driver is designed to butt, wherein in the stop position of the driver the spring means, which are provided between the operating element and the driver, can be compressed by a predetermined spring excursion. The magnitude of the torque which tensions the locking pawl in the position in which it is disengaged from the toothed wheel is then determined by the predetermined spring excursion.

The stop means can especially be formed by a sleeve which is connected to the operating element and which at least partially encompasses the spring means, wherein the open edge of the sleeve is designed to butt against an end face of the driver.

Optionally, provision is made for a locking device for preventing retention of the locking pawl in the case of an only partially released spring-loaded piston, wherein the locking device has a locking bolt which locks the locking pawl in the disengaged position until the spring-loaded piston is fully released. Optionally, the locking bolt has in the main a bolt-like form and is provided with a bolt head which is designed for occupying an engaged position or a disengaged position in relation to a recess of the locking pawl. For example, the locking bolt is pretensioned in the engaged position with the locking pawl by means of a locking bolt spring. Furthermore, the locking bolt can be designed to be movable from the engaged position into the disengaged position by the spring-loaded piston.

The spring force which is created in the spring means as a result of compression of the spring means during an operation of the emergency release device is therefore of sufficient magnitude that the unloaded locking pawl, i.e. already located in the disengaged position, can be reliably held in this disengaged position. The force which is required to compress the spring means up to the stop is smaller than the minimum lift force of the locking pawl which is under load, i.e. located in the engaged position with the toothed wheel. Therefore, the spring characteristic of the return spring of the operating element or of the operating sleeve can be selected with total independence thereof because it has no influence upon the emergency release process.

If, therefore, the operating element is operated or the Bowden cable pulled, then the spring means are first of all tensioned up to the stop against the resistance of the locking pawl which is under load, i.e. located in the engaged position with the toothed wheel. The spring force of the spring means, which is created as a result of the compression, is in this case, however, so low that the locking pawl, under load, cannot be lifted from the engaged position into the disengaged position. Only if the spring means come to rest against the stop on the driver is a force applied to the locking pawl—as a result of the continuing movement of the driver—which is of sufficient magnitude to carry the locking pawl into the fully disengaged position.

Consequently, the energy, which is required to rotate the locking pawl, after disengagement from the teeth of the toothed wheel, into the fully disengaged position in which the locking bolt can lock the locking pawl, is stored as potential energy in the spring means before the locking pawl is lifted from of the teeth of the toothed wheel. If the locking pawl is therefore unlatched from the teeth of the toothed wheel, the locking pawl, driven by the potential energy of the spring means, previously tensioned as a result of the operating process, is lifted out against the action of the restoring force of the return spring of the locking pawl to such a degree that the locking bolt of the locking device can engage on the locking pawl.

According to another disclosed embodiment, the spring means, which are provided between the driver and the locking pawl, can comprise at least one leaf spring. In this case, the driver may be connected to the operating element in an axially fixed manner, wherein the return spring of the operating element is, for example, supported on the driver.

In a disclosed embodiment of the spring brake cylinder, a spindle arrangement with a threaded spindle is arranged in the force flux between the spring-loaded piston and the piston rod as an element of the emergency release mechanism. In this case, the torque of the threaded spindle may be transmitted to the toothed wheel via a movable guide with a feather key. However, the locking pawl and the locking bolt are connected to the piston rod.

The spring brake cylinder can be operated pneumatically, hydraulically or electromechanically, wherein in the case of a design by means of pneumatic or hydraulic operation a pressure connection is provided for supplying a pressure chamber, which is delimited by the spring-loaded piston, with a pressurized fluid.

First of all, the invention may be described based on the disclosed embodiment of a spring brake cylinder 2 shown in FIG. 2 to FIG. 10, as it is used, for example, in a brake caliper as a brake force generator for a disk brake of a bogie of a rail vehicle.

Figure 2:
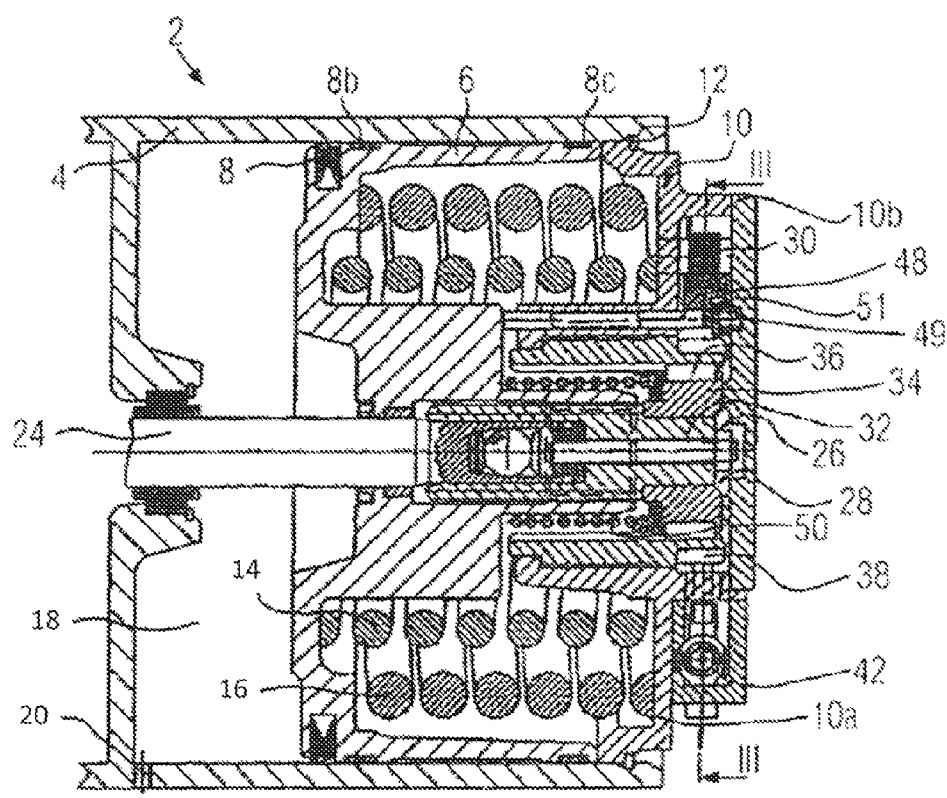
FIG. 2 shows a schematic longitudinal sectional view of a spring brake cylinder with an emergency release device according to a disclosed embodiment.
Figure 3:
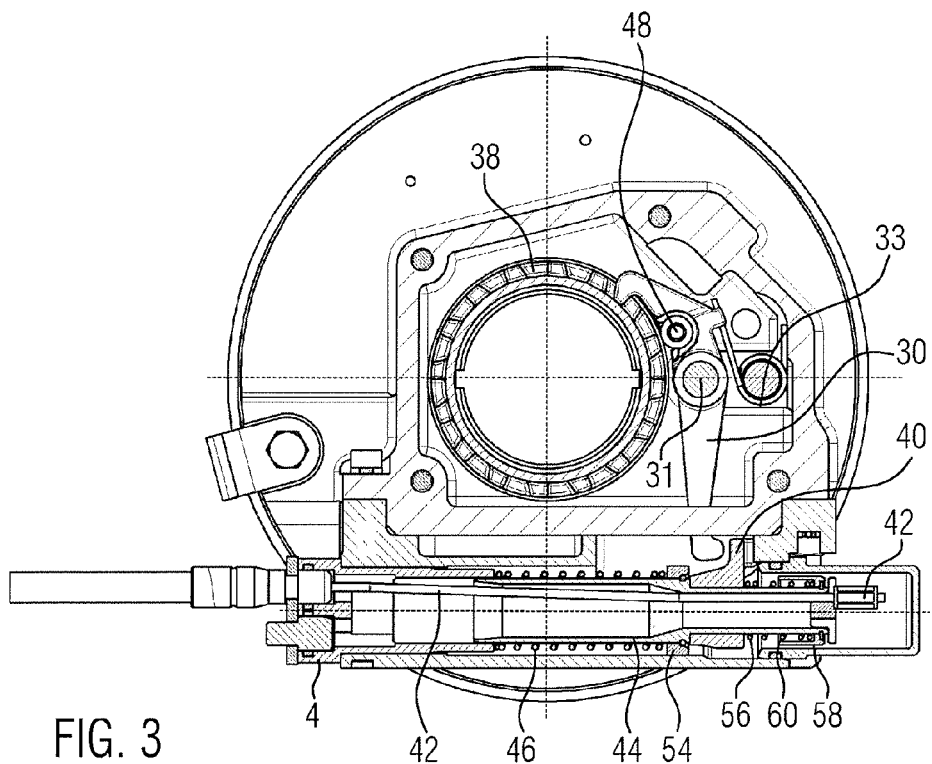
FIG. 3 shows a cross-sectional view of the spring brake cylinder of FIG. 1 along the line of FIG. 2.
Figure 4:
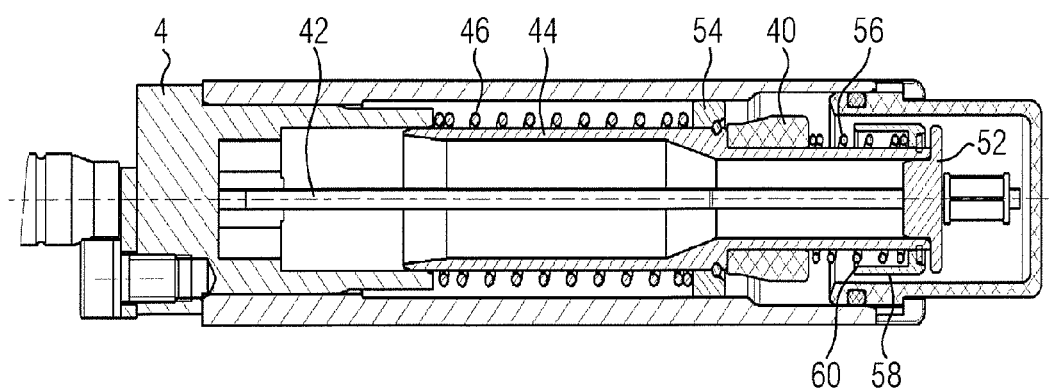
FIG. 4 shows a detail of FIG. 2 in an enlarged view.

FIG. 2 to FIG. 4 show in this case two different views of the spring brake cylinder 2, having a housing 4 in which a spring-loaded piston 6 is arranged in an axially movable manner, with seals and slip bands 8a-8c being distributed on its outer circumference. In this case, two accumulator springs 14, 16 may be arranged between the spring-loaded piston 6 and an axial housing cover 10 which is fastened on the inner circumference of the housing 4 by means of a spring ring 12.

A pressure chamber 18, which is supplied with compressed air via an air connection 20 in the circumference of the housing 4, is formed between the spring-loaded piston 6 and the housing 4. The spring brake can be released and applied by aerating and venting via the air connection 20. If the spring brake cylinder 2 is not in the emergency released operating state, the force of the accumulator springs 14, 16 is supported via the spring-loaded piston 6 either on the pressure chamber or volume 18 or via a piston rod 24 on the brake caliper, which is not shown here.

For releasing the engaged spring brake even without compressed air the spring brake cylinder 6 has an emergency release device 26 which enables an interruption of the force flux between spring-loaded piston 6 and piston rod 24. In the depicted example, the emergency release device 26 is based in the main on the function of a spindle arrangement 28 with a locking pawl 30 which is pivotably mounted between two sections 10a and 10b of the housing cover 10 which are axially offset in relation to each other. Arranged in the force flux between the spring-loaded piston 6 and the piston rod 24 is the threaded spindle 32 of the spindle arrangement 28. The resulting torque of the threaded spindle is transmitted in the locked state, via a movable guide 34 with a feather key 36, to a toothed wheel 38 which can be locked by the locking pawl 30 or can be released (also see in particular FIG. 2).

For this purpose, the one end of the locking pawl 30 engages in the toothed wheel 38 in one of the operating positions of the emergency release device 26. The other end of the locking pawl 30, however, can be lifted from the teeth of the toothed wheel 38 by a driver 40 of an emergency release operating device so that its rotation is freed in this position of the locking pawl 30. As a result, the force flux between the spring-loaded piston 6 and the piston rod 24 can be interrupted. The locking pawl 30 is pivotable around an axis 31. A return spring 33 pretensions the locking pawl in an engaged position in relation to the toothed wheel 38.

If the emergency release device 26 is operated in the event of a braking force or spring force being applied to the piston rod 24, a rotation of the threaded spindle 32 occurs so that the braking force decays and the spring-loaded piston 6 can butt against the housing 4. To this end, the locking pawl 30 has to be brought from its engaged position in relation to the toothed wheel 38, shown in FIG. 2, into a contrastingly disengaged position according to FIG. 8 or FIG. 9. To prevent renewed locking of the locking pawl 30 during the emergency release process, a locking bolt 48 is arranged on the inner face of the section 10b of the spring cover, or housing cover 10, which locking bolt engages in a recess 35 of the locking pawl 30 and can therefore retain the lifted locking pawl 30 in its disengaged position.

The locking bolt 48 has in the main a bolt-like form and on its end facing the housing cover section 10b is provided with a bolt head 51. Arranged between the two-piece housing cover 10a, 10b (which has an indentation in this region) and the bolt head 51 (with axial recess) is a locking bolt spring 49 which pushed the locking bolt 48 in the direction of the locking pawl 30 and ensures that the bolt head 51, in one of the operating positions, engages in the lateral, stepped recess 35 of the locking pawl 30 for accommodating the locking bolt 48 and locks the locking pawl 30 in its released position (see FIG. 9 or FIG. 10). The section of the locking bolt 48 facing away from the bolt head 51 is of bolt-like design, wherein the bolt-like section penetrates the inner housing cover section 10a and during displacement of the spring-loaded piston 6 can be displaced by this in the direction of the housing cover 10, which compresses the locking bolt spring 49 and pushes the locking bolt 48 out of its latched position in the locking pawl 30 (FIG. 2). Only when the spring-loaded piston 6 is located in its operationally ready position again, after an emergency release process, does the locking bolt 48 release the locking pawl 30 for latching in.

As is to be seen best in FIG. 3 and FIG. 4, the emergency release operating device has a Bowden cable 42 and an operating sleeve 44, which is movably mounted in the housing 4, as the operating element, on the free end of which is fastened a head of the Bowden cable 42, optionally directly and for example by means of a cap 52 which is fastened in an end-side opening of the operating sleeve 44. In this case, a sheath of the Bowden cable 42 is supported on the housing 4 on the other side, wherein the Bowden cable 42 axially penetrates the inside of the operating sleeve 44 up to its free end. The operating sleeve 44 is loaded against an operation by the Bowden cable 42 by means of a return spring 46 which is constructed as a helical compression spring.

The return spring 46 is supported on a ring 54 which is fastened on the outer circumference of the operating sleeve 44 and at the same time forms an axial stop for the driver 40 which is constructed as a sliding ring and is axially and movably mounted on the outer circumference of the operating sleeve 44. On the other side, the driver 40 is loaded by means of a helical compression spring 56 in the direction of the ring 54 as an axial stop. This helical compression spring 56 is supported on the other side on a base of a sleeve 58 which is fastened on the end of the operating sleeve 44 on which the head of the Bowden cable 42 is also supported. The sleeve 58, by its free edge 60, forms a further stop for the driver 40 so that this can move axially between the ring 54 and the edge 60 of the sleeve on the operating sleeve 44.

If the Bowden cable 42 is now operated—towards the left in FIG. 2—then the operating sleeve 44 is shifted to the left against the spring forces of the return spring 46. In this case, the driver 40 first of all comes into contact with the other end of the locking pawl 30, wherein the helical compression spring 56 is not yet compressed (FIG. 6).

Figure 7:
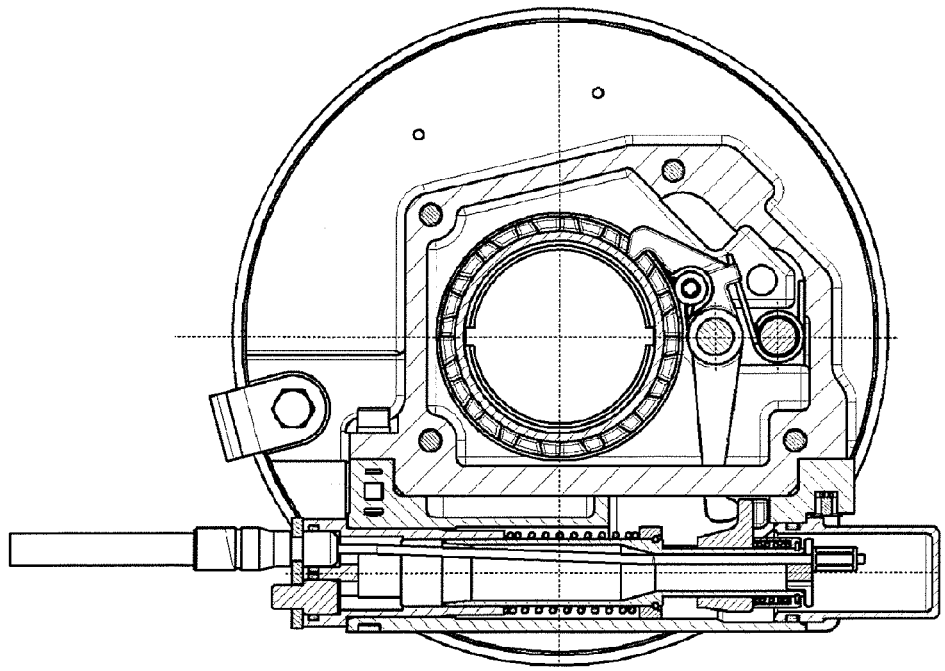

With further operation of the Bowden cable 42, the driver 40 is moved to the right on account of the contact with the other end of locking pawl 30 which is located in the engaged position, wherein the helical compression spring 56 is then compressed to such a degree that the driver 40 butts against the edge 60 of the sleeve 58. FIG. 7 shows this situation.

The helical compression spring 56 is designed in this case so that the spring forces, which are created as a result of its compression which is limited by the stop on the edge 60 of the sleeve 58, or as a result of the spring excursion which is limited thereby, and which are transmitted via the driver 40 to the locking pawl 30, are not sufficient to pivot the locking pawl 30 into the disengaged position in relation to the toothed wheel 38.

Figure 6:
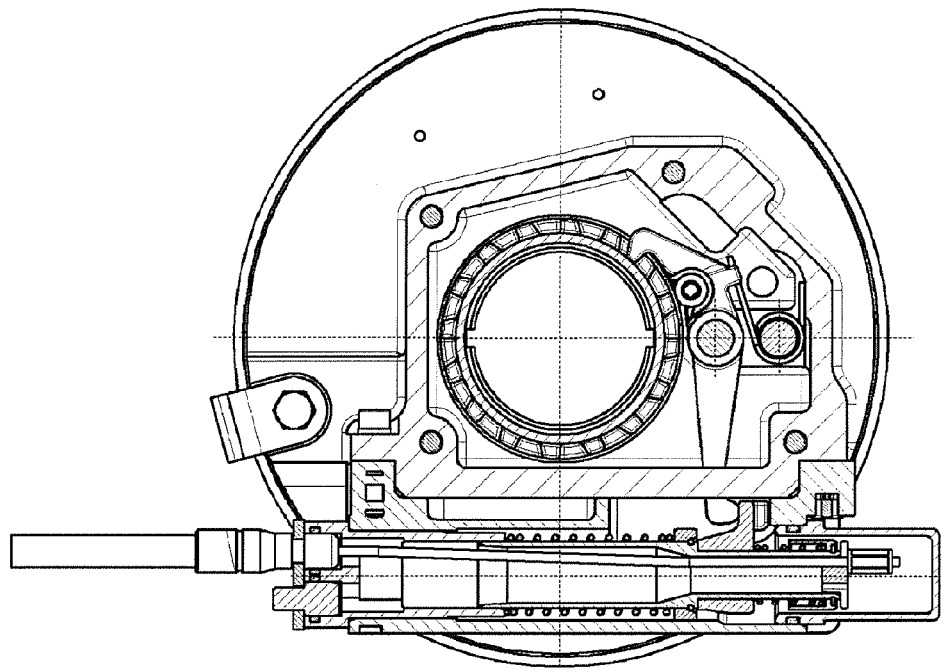
FIG. 6-FIG. 10 show the spring brake cylinder of FIG. 1 in different stages of the emergency release process.
Figure 8:
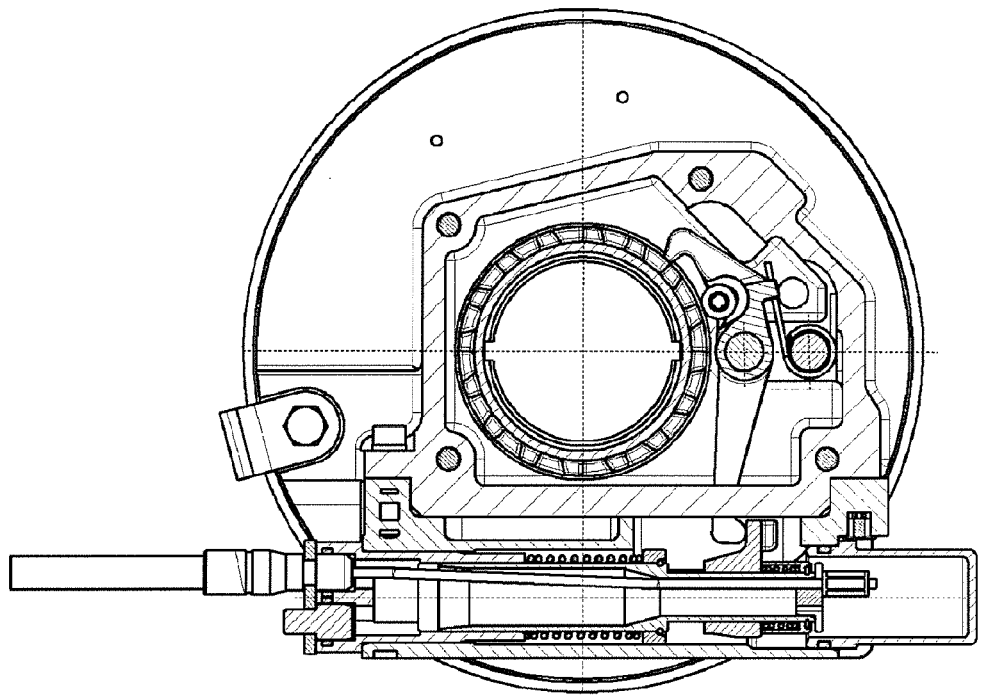

Rather, the operating forces of the further operated Bowden cable 42, which are transmitted to the locking pawl 30 via the driver 40 butting against the edge 60 of the sleeve 58, ensure that the locking pawl 30 disengages from the toothed wheel 38 from its still engaged position according to FIG. 6. The toothed wheel 38 is then free and begins to rotate on account of the braking forces acting via the spindle arrangement 26, which can then decay until the spring brake cylinder 2 is free of braking force (FIG. 8).

Figure 9:
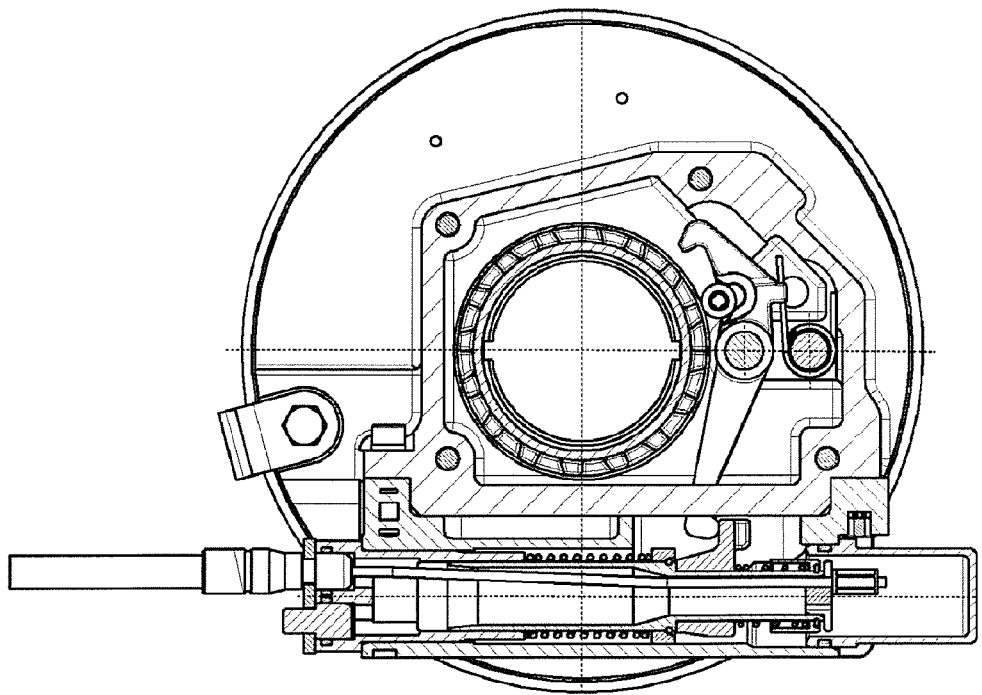

The locking pawl 30 is then no longer loaded by the toothed wheel 38. It is then loaded only by its return spring 33 in the engagement direction with the toothed wheel 38 and by means of the compression of the helical compression spring 56, via the driver 40, in the opposite direction, that is to say out of engagement with the toothed wheel 38. Since the helical compression spring 56 is designed in such a way that the spring force which is exerted upon the locking pawl 30 by means of the helical compression spring 56, or the torque which is exerted on the locking pawl 30 on account of this spring force, is greater than the torque which the return spring 33 exerts upon the locking pawl 30, the locking pawl 30 is pivoted into its fully disengaged position in relation to the toothed wheel 38, as is shown in FIG. 9, without a further operation of the Bowden cable 42 being necessary for it. The helical compression spring 56 decompresses in this case to the left and pushes the driver 40 against the stop on the ring 54.

Figure 10:
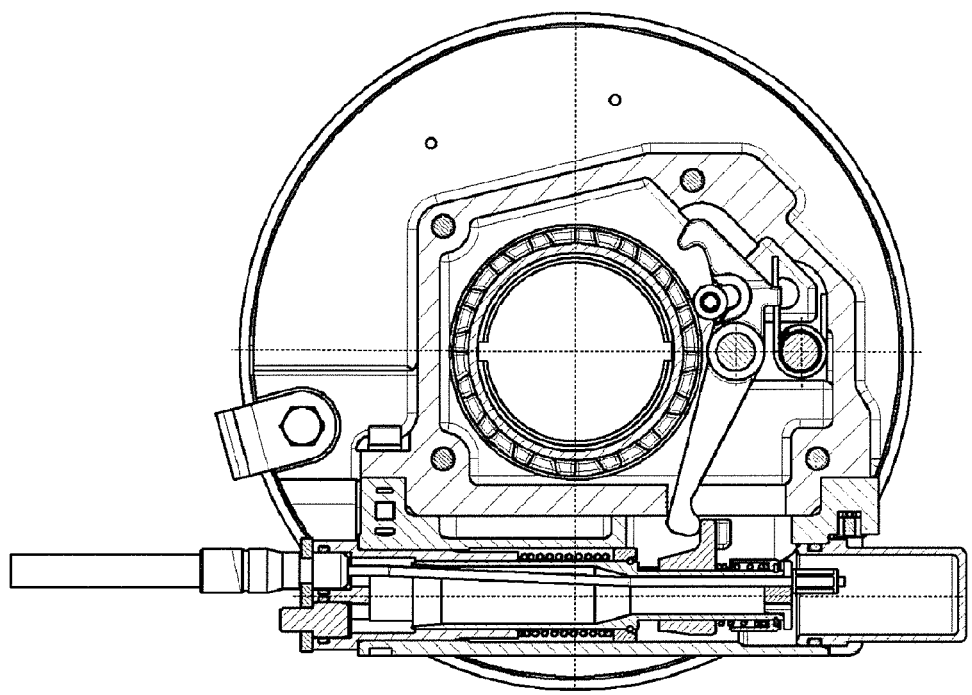

If the maximum travel of the Bowden cable 42 is then reached according to FIG. 10, in which the operating sleeve 44 butts against an inner stop in the housing 4 and the driver 40 moves a little further away from the ring 54 again, the locking pawl 30 remains in its fully disengaged position in which it is then locked by the locking bolt 48 which engages in its recess 35.

Figure 11:
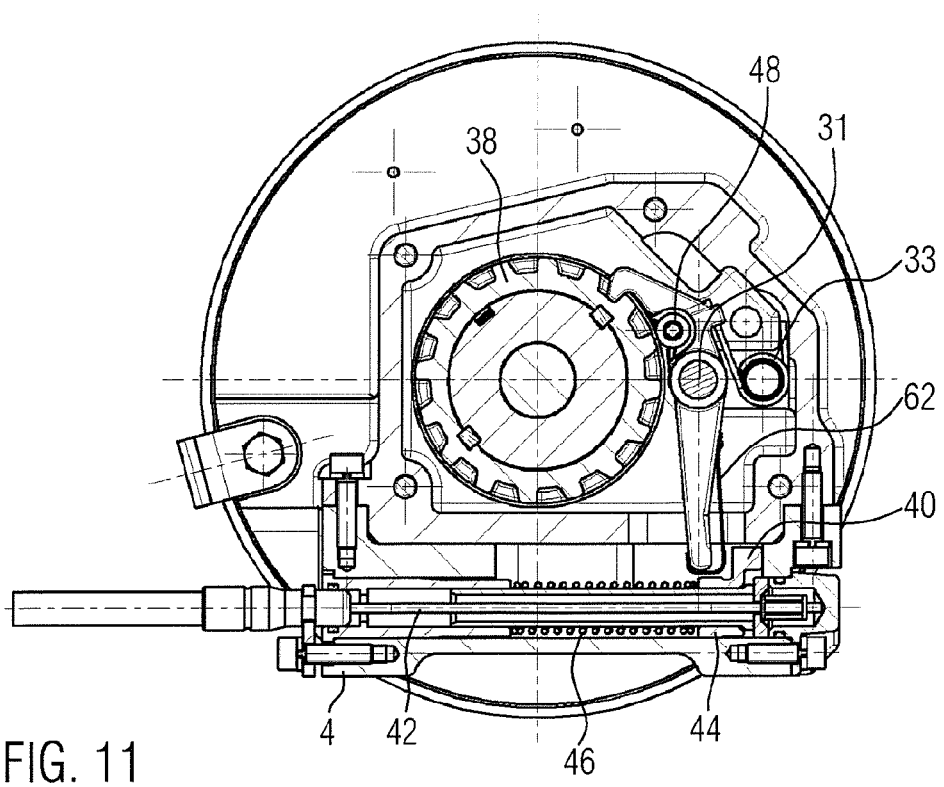
FIG. 11 shows a cross-sectional view of a spring brake cylinder according to another disclosed embodiment.
Figure 12:
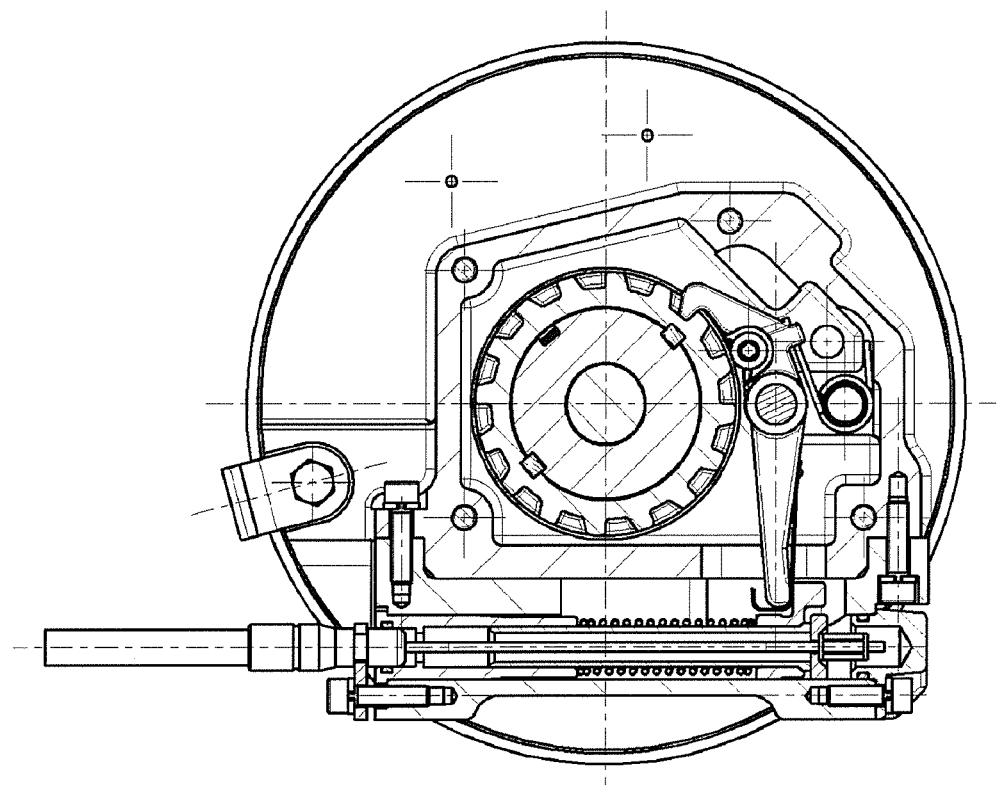
FIG. 12 shows the spring brake cylinder of FIG. 11 during the emergency release process.

In the disclosed embodiment of a spring brake cylinder 2 which is shown in FIG. 11 and FIG. 12, identical or equivalently functioning components and sub-assemblies are identified by the same designations compared with the preceding disclosed embodiment. In contrast to this, the driver 40 is not axially and movably mounted on the operating sleeve 44 but axially fixed there, optionally on the end of the operating sleeve 44. The return spring 46 which returns the operating sleeve 44 or the Bowden cable 42 to its initial position is then supported for example on one side on the housing 4 and on the other side on the driver 40. The spring means which are provided here between the driver 40 and the locking pawl 30 may consist in a leaf spring 62 which by its one end is fastened for example on the arm of the locking pawl 30 pointing towards the driver 40 and by its other end has a clear distance s, partially encompassing the end of this arm, in relation to this arm. By this clear distance s, forming a predetermined spring excursion, the leaf spring 62 is then compressed, under flexural load, when the Bowden cable 42 is operated and consequently the driver 40 contacts and pivots the locking pawl 30, as gathered from FIG. 12.

As in the case of the preceding disclosed embodiment, a potential energy or a spring force is then stored in the leaf spring 62, which potential energy or spring force depends upon the predetermined spring excursion s and which brings the locking pawl 30 into the fully disengaged position, or holds it in this position, when this has been brought into the position in which it is disengaged from the toothed wheel 38 by operation of the Bowden cable 42. The leaf spring 62 is similarly connected in parallel in relation to the return spring 46 according to FIG. 5.

LIST OF DESIGNATIONS

2 Spring brake cylinder
4 Housing
6 Spring-loaded piston
8a-8c Seals/slip bands
10a, 10b Housing cover
12 Spring ring
14, 16 Accumulator spring
18 Pressure chamber
20 Air connection
24 Piston rod
26 Emergency release device
28 Spindle arrangement
30 Locking pawl
31 Axis
33 Return spring
31 Threaded spindle
34 Guide
35 Recess
36 Feather key
38 Toothed wheel
40 Driver
42 Bowden cable
44 Operating sleeve
46 Return spring
48 Locking bolt
49 Locking bolt spring
50 Return compression spring
51 Bolt head
52 Cap
54 Ring
56 Helical compression spring
58 Sleeve
60 Edge
62 Leaf spring

The invention claimed is:

1. A spring brake cylinder, having a housing in which a spring-loaded piston, loaded using at least one accumulator spring, with a piston rod is axially movable, and also having an emergency release device comprising an emergency release operating device, an emergency release mechanism with a toothed wheel for interrupting a force flux between spring-loaded piston and piston rod, and also having a retaining device which is designed for holding the emergency release device in different retained positions, wherein the retaining device has a locking pawl which can be pivoted into an engaged and disengaged position in relation to the toothed wheel, and the emergency release operating device has at least one operating element which is movable in relation to the housing and loaded in its initial position using a first return spring, and also having a driver which can be operated together with the operating element for driving the locking pawl in such a way that during an operation of the operating element the operating force is transmitted to the driver and from this transmitted to the locking pawl for transferring the locking pawl from an engaged position in relation to the toothed wheel into a disengaged position, wherein, between the operating element and the driver, or between the driver and the locking pawl, provision is made for a spring arrangement connected in parallel to the first return spring and during the driving of the locking pawl are compressed by the driver, creating a spring force which tensions the locking pawl in the position in which it is disengaged from the toothed wheel.

2. The spring brake cylinder of claim 1, wherein the operating element has at least one Bowden cable and also an operating sleeve which is movably mounted in the housing and on which is fastened the Bowden cable and which is loaded against an operation by the Bowden cable by a restoring return spring included in the first return spring.

3. The spring brake cylinder of claim 1, wherein the spring arrangement is designed so that spring force which is exerted upon the locking pawl by the spring arrangement is smaller than a force which is necessary in order to move the locking pawl from the engaged position in relation to the toothed wheel into the disengaged position.

4. The spring brake cylinder of claim 1, wherein the locking pawl is loaded in the engaged position in relation to the toothed wheel using a second return spring, wherein the spring arrangement is designed such that the torque which is exerted upon the locking pawl by the spring arrangement is greater than the torque which the return spring exerts upon the locking pawl.

5. The spring brake cylinder of claim 1, wherein a first spring included in the spring arrangement is provided between the operating element and the driver and includes at least one helical spring.

6. The spring brake cylinder of claim 5, wherein the driver is movably mounted next to or on the operating element.

7. The spring brake cylinder of claim 6, further comprising a stop connected to the operating element and against which the driver is designed to butt, wherein in the stop position of the driver, the first spring included in the spring arrangement provided between the operating sleeve and the driver can be compressed by a predetermined spring excursion and wherein the magnitude of the torque which tensions the locking pawl in the position in which it is disengaged from the toothed wheel is determined by the predetermined spring excursion.

8. The spring brake cylinder of claim 7, wherein the stop is formed by a sleeve which is connected to the operating sleeve and which at least partially encompasses the first spring included in the spring arrangement, wherein the open edge of the sleeve is designed to butt against an end face of the driver.

9. The spring brake cylinder of claim 1, wherein a second spring included in the spring arrangement is provided between the driver and the locking pawl and comprises at least one leaf spring.

10. The spring brake cylinder of claim 9, wherein the driver is connected to the operating element in an axially fixed manner.

11. The spring brake cylinder of claim 1, wherein provision is made for a locking device for preventing retention of the locking pawl in the case of an only partially released spring-loaded piston.

12. The spring brake cylinder of claim 11, wherein the locking device has a locking bolt which locks the locking pawl in the disengaged position until the spring-loaded piston is fully released.

13. The spring brake cylinder of claim 12, wherein the locking bolt has in the main a bolt-like form and is provided with a bolt head which is designed for occupying an engaged position or a disengaged position in relation to a recess of the locking pawl.

14. The spring brake cylinder of claim 13, wherein the locking bolt is pretensioned in the engaged position with the locking pawl by of a locking bolt spring.

15. The spring brake cylinder of claim 13, wherein the locking bolt can be shifted from the engaged position into the disengaged position by the spring-loaded piston.

16. The spring brake cylinder of claim 12, wherein the locking pawl and the locking bolt are connected to the piston rod.

17. The spring brake cylinder of claim 1, wherein a spindle arrangement with a threaded spindle is arranged in a force flux between the spring-loaded piston and the piston rod as an element of the emergency release mechanism.

18. The spring brake cylinder of claim 17, wherein the torque of the threaded spindle is transmitted to the toothed wheel via a movable guide with a feather key.

19. The spring brake cylinder of claim 1, wherein the spring brake cylinder is operated pneumatically, hydraulically or electromechanically and in the case of a design by pneumatic or hydraulic operation has a pressure connection for supplying a pressure chamber, which is delimited by the spring-loaded piston, with a pressurized fluid.

* * * * *